Figure 7:
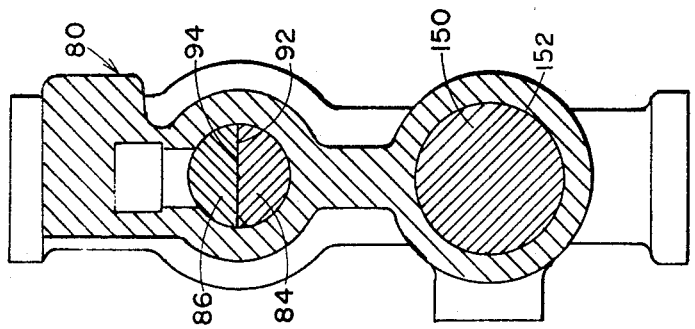

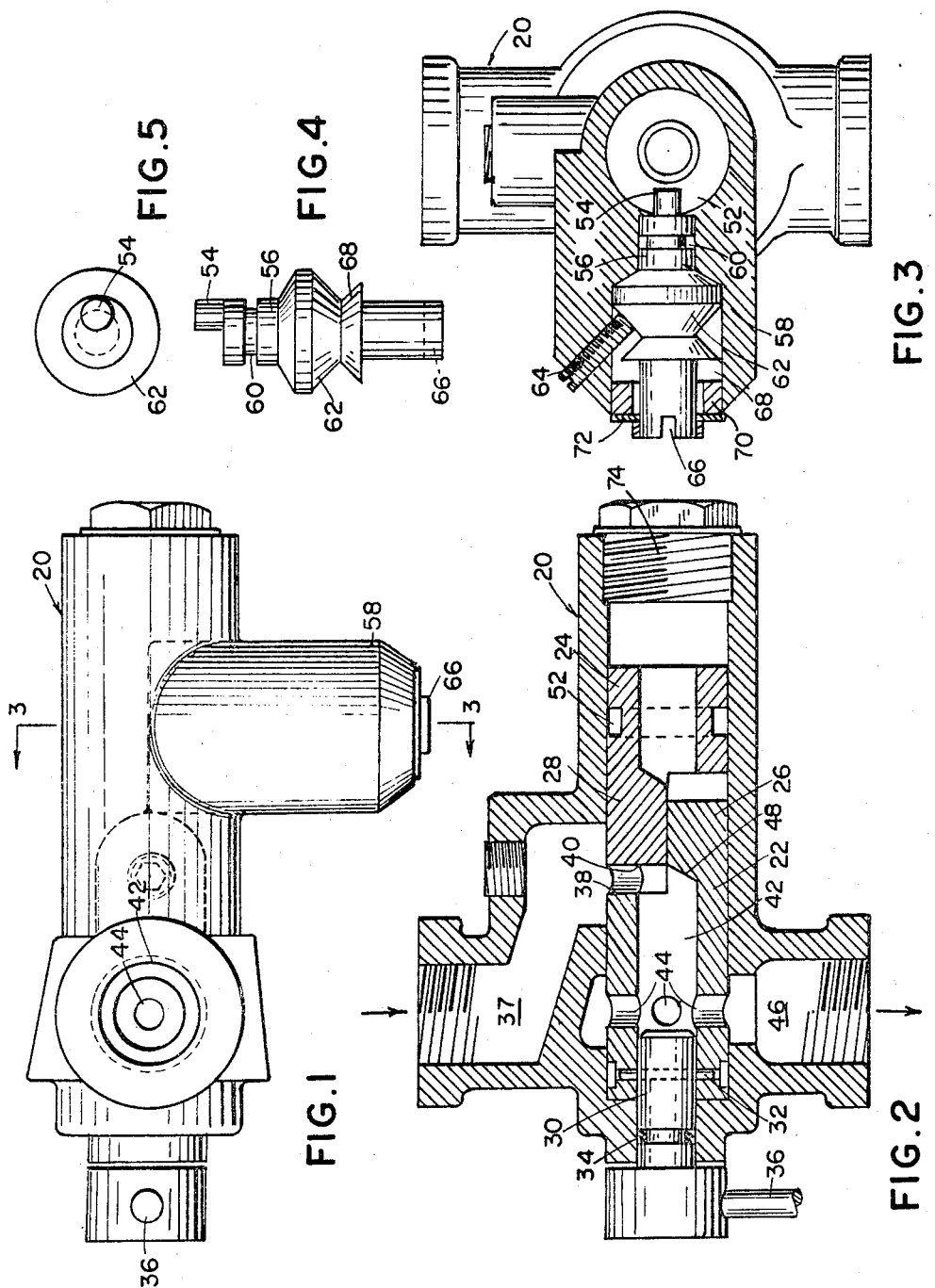

INVENTOR.
H. E. Lake
BY Moses, McGlew & Toren
ATTORNEYS.

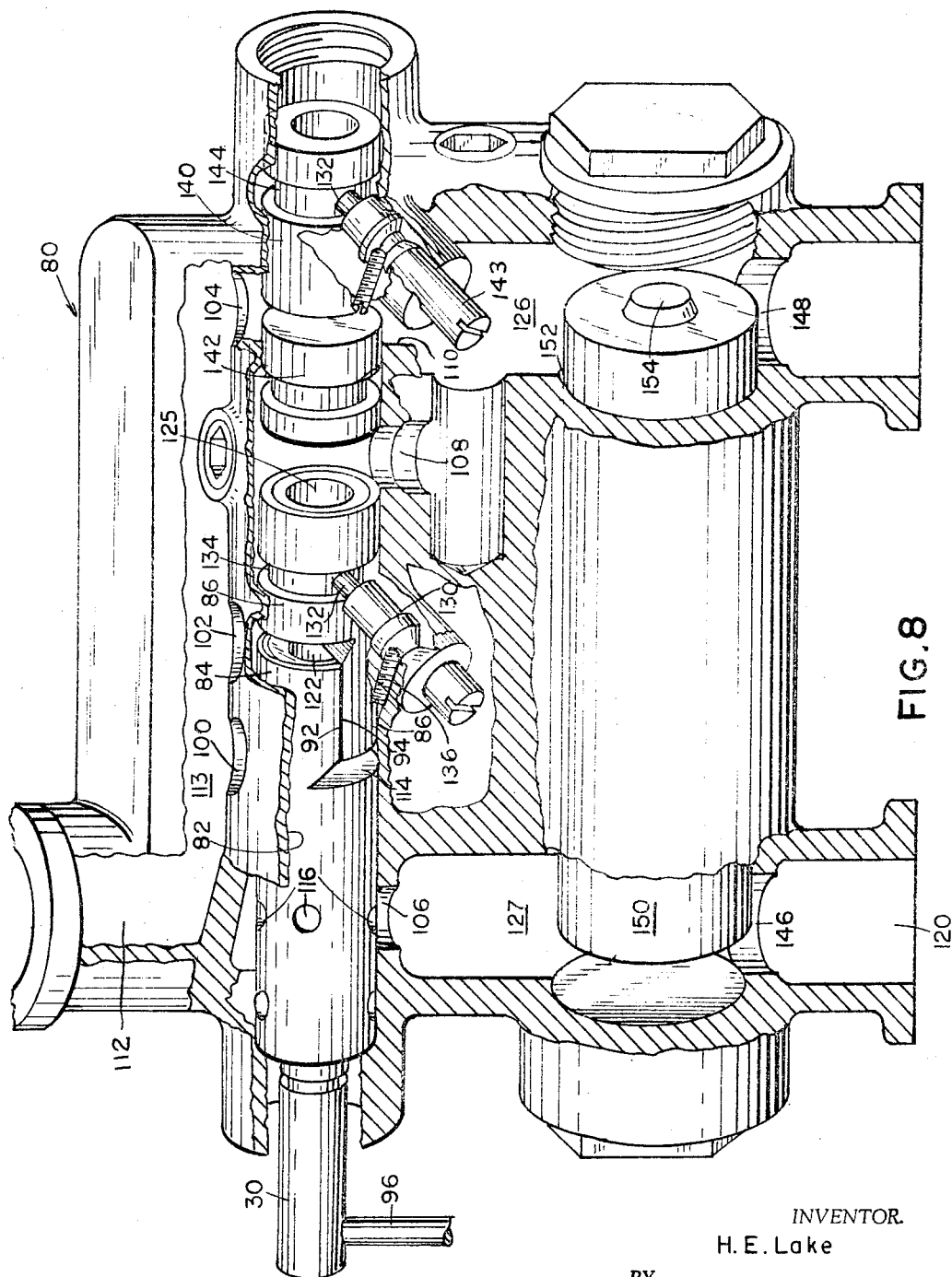

Sept. 13, 1966    H. E. LAKE    3,272,216
FLOW PROPORTIONING VALVE
Filed April 22, 1963    4 Sheets-Sheet 4

INVENTOR.
H. E. Lake
BY Moses, McGlew & Toren
ATTORNEYS.

3,272,216
FLOW PROPORTIONING VALVE
Harry E. Lake, Mountain View, Calif., assignor to Todd Shipyards Corporation, New York, N.Y., a corporation of New York
Filed Apr. 22, 1963, Ser. No. 274,449
13 Claims. (Cl. 137—99)

This invention relates to flow proportioning means in the nature of metering valves for controlling the flow of fluids. It may be used for general purposes for controlling the flow of liquids or gases but in its more specific aspects, it is designed for the control of flow of fuel oil to oil burners.

In the operation of oil burners, it is necessary to synchronize the varying amounts of oil to be burned with the varying amounts of steam or air used in atomizing the oil and the varying amounts of secondary air supplied for completing combustion. These quantities are controlled by dampers or valves which should be so designated that an equal movement of the regulating means produces the required corresponding variations in the quantities of the different elements supplied. Preferably, the different variables are each designed for straight line regulation, that is, after initial adjustment has been made equal increments of movement of the regulating means should produce proportional quantities of each of the elements to be supplied. A special feature of the present invention is that the metering means for the oil or other liquid is of a nature to pass equal increments of the liquid for equal movements of the liquid controlling or valve operating means.

It is therefore the primary object of the invention to provide a valve construction in which the valve opening varies in size directly in accordance with the movements of the valve operating means, this being accomplished effectively by making the valve slot or slots of such nature that they are parallel sided or approximately rectangular for all adjustments, both of the valve opening and closing means and of the preliminary valve capacity setting means.

For purpose of illustrating the mode of operation and the principles of the invention, two forms of the invention have been shown, one of which consists of a simple valve arrangement suitable for controlling the flow of liquids of substantially constant viscosity and, in the more sophisticated form, provision of a flow control means which will take care of variations in the viscosity of the liquid, such as occur with the handling of fuel oil under varying temperature conditions. In the handling of fuel oil particularly, it has become the practice to have the pump or other fluid supplying means deliver more than the requirements of the burner, the surplus oil being by-passed to the supply tank. Under such conditions, it is important to maintain the proper proportioning of the oil going to the burner and the oil being returned to the supply tank. Such proportioning must be maintained, irrespective of the viscosity or of the rate of flow desired.

A specific description of the two examples of the invention referred to taken in connection with the drawing showing such examples will make clear the nature and mode of operation of the invention. Further advantages and objects of the invention will also be clear from the following detailed description.

Figure 6:
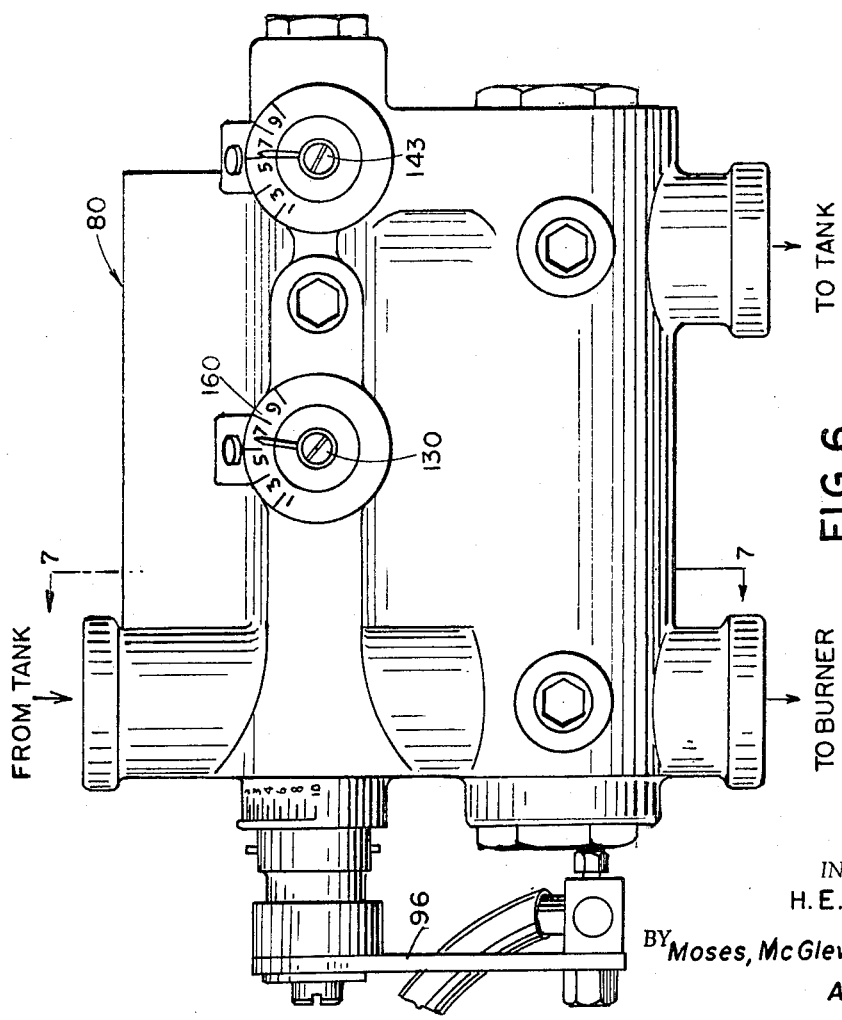
Figure 9:
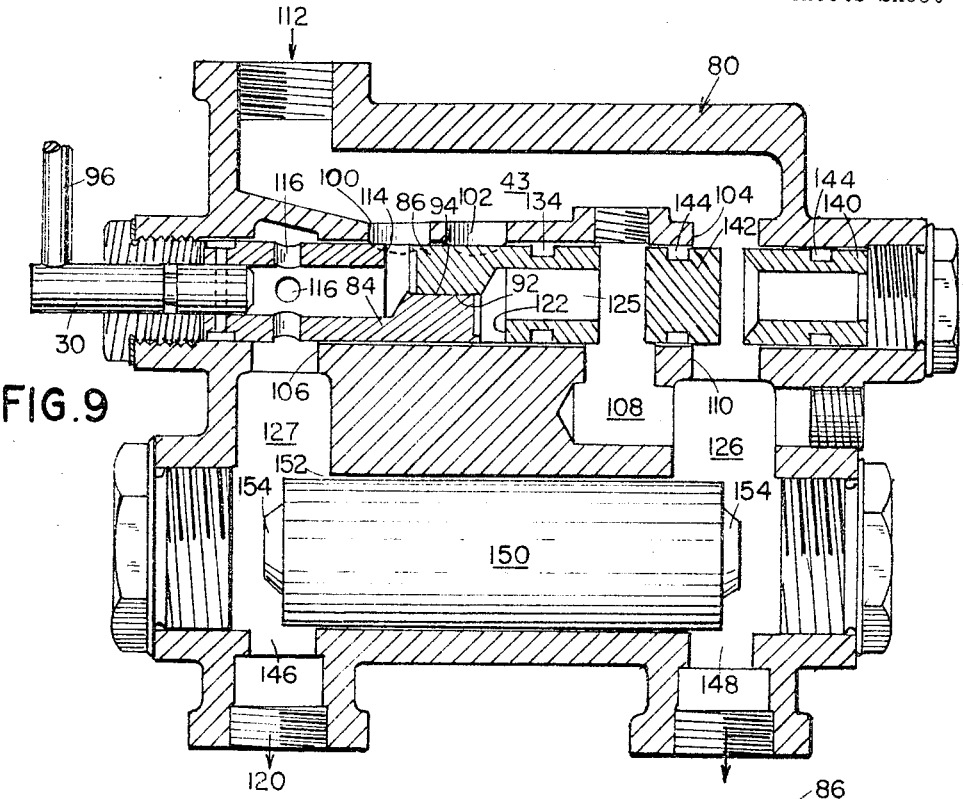
Figures 10, 11:
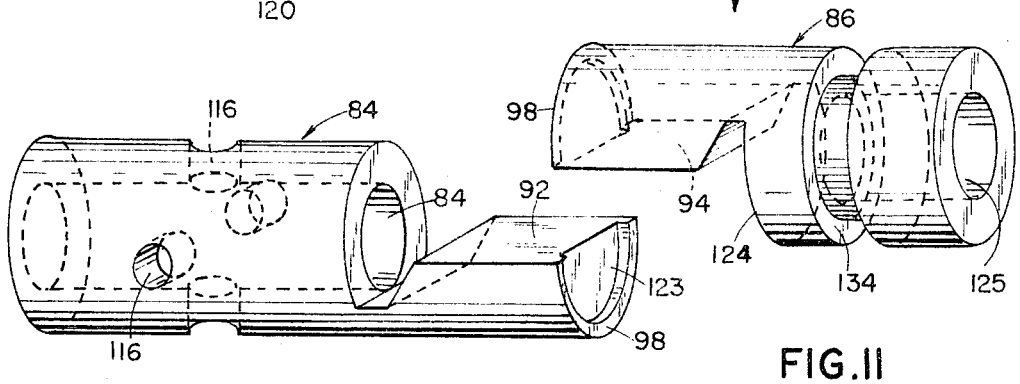

In the drawings:
FIG. 1 is a plan view of a simple valve applicable to the control of fluids in which variations in viscosity of the fluid are not such as to be important;
FIG. 2 is a vertical sectional view of the valve shown in FIG. 1;
FIG. 3 is a transverse section taken on line 3—3 of FIG. 1;
FIG. 4 is a longitudinal sectional view of the valve adjusting lock shown particularly in FIG. 3;
FIG. 5 is a plan view of the valve adjusting lock shown in FIG. 4;
FIG. 6 is a side elevation of a flow control valve which will take care of oils which vary in viscosity and which also provides means for by-passing part of the oi flow;
FIG. 7 is a vertical sectional view on line 7—7 of FIG. 6;
FIG. 8 is a perspective view, partly broken away, of the structure shown in FIG. 6;
FIG. 9 is a central longitudinal vertical section of the valve construction shown in FIGS. 6, 7 and 8; and
FIGS. 10 and 11 are perspective views showing the two adjustable parts of the main valve.

Referring to the drawings in detail and first to the simple valve construction shown in FIGS. 1 to 5, 20 is the valve body or casing having a cylindrical bore extending therethrough. In this bore is mounted a two-part rotary valve cylinder comprising two mated parts 22 and 24. These mated parts each have a cylindrical portion and a half-cylindrical extension which mates with the half-cylindrical extension on the other part. The half-cylindrical extension on the part 22 is marked 26 and the half-cylindrical extension on the part 24 is marked 28. These parts are generally similar to the mating valve parts illustrated more particularly in FIGS. 10 and 11. The valve part 22 does not have longitudinal movement in the casing but is rotatable therein. For this purpose, it is fixed to a shaft 30 in any suitable manner as by means of a pin 32. The shaft passes out through the end of the housing, a packing ring 34 being preferably provided to prevent leakage around the shaft. On the projecting end of the shaft is mounted a suitable operating lever 36 which may be manually operated or moved by any suitable control mechanism (not shown). Mating valve part 24 will rotate in the bore in the valve housing whenever the part 22 is rotated due to the engagement of the flat faces of the extensions or heads 26 and 28 of the two valve parts.

Oil under pressure from a pump or other source (not shown) enters the passage 37 in the casing. It then passes through the adjustable inlet orifice formed between the surface 38 of the valve part 22 and the parallel surface 40 of the valve part 24 which can be adjusted in width by moving the valve part 24 longitudinally so as to make the discharge orifice wider or narrower. The oil entering the adjustable inlet orifice described passes through the cylindrical bore 42 of the valve part 22 which is provided with ports 44 which are in constant communication with an oil outlet 46. The surface 48 at the end of the bore 42 is inclined so as to allow free flow of the oil through the bore which is partly overhung by the head or extension 26.

Valve part 24 may be adjusted longitudinally of the cylindrical bore in the valve housing in any suitable manner but as shown, the valve part is provided with annular groove 52 in which works the eccentric cam pin 54 on the end of a valve lock member 56 which is rotatably mounted in a transverse hole in a lug 58 formed on the side of the valve housing. By rotating the lock member in this bore, the cam pin 54 will cause the valve part 24 to be moved longitudinally so as to vary the width of the discharge orifice. The rotatable valve lock 56 is provided with a groove in which is a packing ring 60 and is formed with a conical enlargement 62 which is engaged by an inclined locking screw 64. When the locking screw 64 is screwed in, it will hold the member 56 in the adjustment to which it is set. The locking screw may be backed off at any time, thereby releasing the lock cylinder and permitting it to be adjusted by turning, as by means of a screwdriver inserted in the slot 66.

The locking member is also shown as provided with a flange 68. In the end of the bore in the lug 58 a stop collar 70 is preferably fitted which will engage the flange 68 when the locking screw 64 is withdrawn so as to prevent any possibility of the lock being blown out when the screw 64 is backed off. On the outside of the stop collar 70 a graduated dial 72 is mounted so as to enable the adjustment of the lock to be readily noted. The end of the cylindrical bore in the valve housing is closed by means of a plug 74.

It will be seen that the eccentric pin 54 working in the groove 52 will provide for a graduated opening of the valve. When closed, the pin 54 will occupy a horizontal position with respect to the axis of the lock member 56. Initial rotation of the lock will provide a minimum movement of the valve part which will increase in harmonic ratio until the pin has moved through 90° when the maximum valve movement has taken place. This provides for a very fine adjustment at small openings and a coarser adjustment at large openings where fine adjustment is unnecessary.

With the simple construction described it will be seen that the width of the inlet slot between the two valve parts may be changed by means of the lock cylinder 56. This adjustment is chosen so as to regulate the maximum size of the inlet orifice which is required for the desired flow. This setting is made for any particular maximum flow desired. The regulation of the flow to the burner, dependent on the operating conditions which may exist from time to time, is accomplished by rotating the lever 36 and the valve parts connected therewith. Such rotation changes the length of the inlet orifice which is exposed. The length of the orifice may therefore be changed from zero to a maximum, which may be approximately one-half of the circumference of the valve parts if the port in the casing is large enough. The shape of the orifice, however, is that of a parallelogram so that approximately equal changes of rate of flow are secured by equal movements of the valve operating lever 36.

While the valve part 24 is shown with a bore extending therethrough from the head 28 to the right hand end of the valve part, there is no flow of fluid through this bore in this simple type of valve.

*Flow control device with automatic adjustment for variable viscosity of oil and provision for by-passing surplus flow*

Referring now to the embodiment of the invention shown in FIGS. 6 to 11, there is a valve housing or body 80 in which is a cylindrical bore 82 in which rotate the interlocking or mating valve members 84 and 86 which are similar to the valve members 22 and 24 shown in FIGS. 1 to 5. The valve portions have the horizontal surfaces 92 and 94 which slide over one another as the valve member 86 is adjusted. These surfaces remain in contact and cause the valve member 86 to rotate with the valve member 84 when the valve member 84 is rotated by the operating lever 96. The operating lever may be rotated manually or by any automatic control device. The heads of valve members 84 and 86 are each preferably provided with a narrow flange 98.

In the construction shown, there are three inlet ports into the bore 82; namely, ports 100, 102 and 104. There are also three outlet ports in the bore; namely, 106, 108 and 110. The fluid under pressure comes from the pump (not shown) into the valve body and enters the space 43 through the inlet 112 and when the valve is rotated to open position, some of the fluid passes through the port 114, through the holes 116 in the valve member 84 to the outlet port 106 to the burner outlet 120. Part of the fluid passes through the port 102, through the adjustable port 122, between the vertical face 123 of the valve 84 and the vertical face 124 of the valve member 86, through the bore 125 in the valve member 86, and flows out through the port 108 in the bore 82. Port 108 discharges into the by-pass chamber 126 which leads to the return passage 148 which discharges surplus oil to the tank. Some of the oil from the source of supply passes through port 104 to the by-pass chamber 126 and thence back into the oil tank. Orifices 114 and 122 are adjustable in width by adjustment of the valve member 86 toward and from the valve member 84. Irrespective of the adjustment, the widths of these two ports or orifices 114 and 122 are always equal to each other. However, the lengths of these passages and therefore the amount of oil which may be passed through these orifices may be varied by the rotary position of the valve. In other words, passage 114 may be long and passage 122 may be short, or one may be entirely open, while the other may be entirely closed.

Adjustment of the distribution of oil through passages 114 and 122 is determined by relative adjustment between the two valve elements 84 and 86. This is adjusted by means of a rotary lock 130 as shown in FIG. 8 and similar to the lock 54 shown in FIGS. 3, 4 and 5. This lock has a cam pin 132 which works in a groove 134 in the valve member 86. The lock may be fixed in adjusted position by means of a lock screw 136.

The proportioning of the amount of oil which can ultimately pass to the oil burner and the amount by-passed at all times is determined by the adjustment of the by-pass valve 140 which can be set closer to or further from the stop 142 which is mounted in fixed position in the bore 82. The by-pass valve 140 is provided with a groove 144 which is engaged by a cam pin 132 on a rotary lock 143 which is shown in FIG. 8. The space between the end of the by-pass valve 140 and the stop 142 is adjusted so that a definite minimum proportion of oil from the supply pump is by-passed back to the tank. For instance, if the oil pumped amounts to 100 gallons in a unit of time, the valve 140 may be set so that 40 gallons will be by-passed at all times to the tank. The remaining 60 gallons will pass through the outlet ports 100 and 102, the amounts passing through each of these ports depending upon the rotation of the rotary valve members between open and closed position. When the rotary members are rotated so that the port 114 is fully opened, all of the 60 units of oil will be passed through the ports 100 and 106 to the passage 120 leading to the burner. However, if this entire amount of oil is not needed by the burner, then the lever 96 is turned so as to partly close the port 114 and partly open the port 122. Thereupon, that part of the oil not passed into port 114 and out through the port 106 directed to the burner passes through the port 122, through the passage 125 in the adjustable valve member and out through the discharge port 108 to the by-pass chamber 126.

The form of the invention just described is particularly designed for use with systems using the heavier grades of oil and in which it is desirable to heat the oil. Heating the oil reduces its viscosity and makes it easier to handle. Furthermore, the lower grades of oil are not all uniform and the viscosity will vary from time to time, depending upon the particular oil being supplied. In systems using heated oil, the temperature of the oil and its viscosity may vary in different parts of the system, particularly in the oil return passages. This may be due to interruptions of the flow allowing the oil to cool off in the return passages or the viscosity may vary from other causes. Changes in viscosity cause changes in back pressure and thus upset the balance or proportioning of the oil going directly to the burner and the oil being returned.

To provide for this variable pressure differential between the liquid in the supply to the burner and the liquid return outlet, means are provided by which the port openings 146 and 148 are controlled so as to partly close one and open the other to such an extent that the pressure is equalized in the by-pass chamber 126 and the chamber 127 supplied by the port from which the oil passes to the burner. This is accomplished in the construction shown by using a sliding piston 150 which slides freely in a cylindrical bore 152 in the valve casing. This piston is so arranged that it moves from the area of greater pressure toward the chamber where the pressure is lower and reduces the area of one or the other of the openings 146 or 148, whichever is under greater pressure, until the pressure on both ends of the piston is the same and all of the oil outlet slots discharge with equalized pressure.

Each end of the piston is provided with a stop 154 which will prevent the piston from moving so far as to close either of the ports 146 and 148 entirely. This makes certain that the valve will always be dealing with an operative condition so that the equalizing function will be performed.

The adjustment of the valve part 86 and the width of the slots between the two valve parts may be observed by a reading of the dial 160 mounted adjacent to the rotary lock which shows the setting of the adjustment of the valve part 86.

It is to be particularly noted that all of the adjustments described may be accomplished from the outside of the valve body and without the possibility of leakage of oil and without exposing the operator in any way to injury from escape of the oil which may be hot and is always under high pressure.

While certain preferred embodiments of the invention have been shown for purposes of illustration of the principles of the invention, it will be understood that the invention is not limited to such specific embodiments and the appended claims are intended to cover the invention in whatever form its principles may be employed.

What is claimed is:

1. A metering valve for fluids comprising a valve chamber having a cylindrical bore therein, an inlet for fluids connected into said bore, outlet means connected into said bore at a spaced location from said inlet and a two-part valve rotor for rotation in said bore comprising a part mounted for rotation in said bore but held against longitudinal movement therein, means for rotating said part, and a mating valve part mounted for rotation in said bore, said two valve parts having mating sections provided with surfaces extending longitudinally to the axis of the valve, the surface on the first valve part causing rotation of the second valve part when the first valve part is rotated, said valve parts having facing transverse surfaces defining between them a discharge orifice for the valve communicating with said outlet means for moving the second valve part toward and away from the first valve part so as to adjust the width of the discharge orifice, the discharge orifice always having the shape approximating a parallelogram of variable width axially of the valve.

2. A construction as claimed in claim 1, in which the second valve part has an annular groove therein and including a rotary lock having a cam pin working in said groove so as to adjust the position of said second valve part, and a locking screw for locking said rotary lock in adjusted position.

3. A flow proportioning valve for fluids comprising a valve chamber having a cylindrical bore therein, an inlet for fluids connected into said bore, outlet means connected into said bore at a spaced location from said inlet and a two-part valve rotor for rotation in said bore comprising a first part mounted for rotation but held against longitudinal movement in the bore and a mating valve part mounted for rotation in said bore but adjustable longitudinally toward and from said first valve part, said valve parts each having a semi-cylindrical head thereon having a plain surface extending diametrically of the valve part, said surfaces being slidable one over the other when said second valve part is moved for adjustment, said valve parts being hollow said outlet means including an oil discharge chamber, said first valve part having a constantly open port opening into an oil discharge chamber, each of said valve parts having a transverse wall at the end of the head thereon and a transverse wall separating the head from the main part of the valve part, said two sets of transverse walls being always parallel each set cooperating to form a slot and so arranged that the slots are of equal width with respect to each other for all adjustments of the valve parts, means operable from outside of the valve body for adjusting the position of the second valve part so as to vary the width of said slots, and means operable from outside of the valve body for rotating said first valve part and with it the mating second valve part, so as to vary the effective circumferential length of said slots.

4. A construction as claimed in claim 3 wherein said outlet means constitutes a return chamber adapted to communicate with the oil tank, the hollow in said second valve part discharging surplus oil into said return chamber.

5. A construction as claimed in claim 4, wherein said outlet means includes at least two outlets and in which there is an equalizing piston movably mounted in the valve body, the ends of which are exposed respectively to the oil pressure in said outlets.

6. A construction as claimed in claim 5 in which there is a by-pass for oil from the oil supply to the return chamber through the valve body separate from the two-part adjustable control valve.

7. A construction as claimed in claim 6 in which there is an adjustable valve in said separate by-pass.

8. A flow proportioning device for fluids, comprising a pressure chamber having an inlet and outlet with differential pressure between the two, a rotating valve within the pressure chamber consisting of two operating parts defining a parallel walled metering slot between them co-acting with said outlet, one part connected with a regulating arm to control the effective length of the metering slot with respect to said outlet and the other adjustable endwise from outside by a locking adjustment being so designed as to provide a close adjustment between said two operating parts when the slot is narrow and not so close as the slot widens, said slot always remaining parallel sided with the area at any setting of the adjustment directly proportional to the angular movement of the regulating arm from the full open to the full closed position and vice versa.

9. A flow proportioning device for fluids of variable viscosity consisting of a main body comprising a pressure chamber having an inlet and two or more outlets with differential pressure between the inlet and outlets, a rotating valve within the pressure chamber, and means for rotating this valve, said valve consisting of two operating parts defining supply and by-pass slots between them, one valve part having a rotary motion only, a regulating arm connected to said valve part, and the second valve part rotating with the first but also sliding with reference to it, said second valve part being adjustable from the outside to govern the width of the supply and by-pass slots, said two parts synchronized to produce a combined uniform width of the two slots and provide throughout the movement of the regulating arm an exposed total area of the two parallel sided slots equal to the exposed area of either slot in the full open position and adjustable means for by-passing separately all liquid being supplied from a pump or otherwise that is in excess of the maximum required for the supply slot in the full open position of the supply slot.

10. A flow proportioning device as claimed in claim 9, wherein one of said outlets is a supply outlet and another is a return outlet and wherein said device is provided with means for automatically throttling without closing the opening to the liquid supply outlet or the liquid return outlet by means responsive to higher pressure in the return or supply line to produce equal pressure at the supply and return ports.

11. A flow proportioning device for liquids of variable viscosity comprising wall means defining a pressure chamber with a supply port and a return port containing a combination rotating and sliding valve in said pressure chamber, operating means connected through said wall means to said valve for rotating said valve operated from the outside said valve and said wall means being so constructed and arranged that liquid delivered at the inlet will be divided between said supply port and said return port in such a way that the same total volume will be discharged through the two ports but with variable amounts through the supply port depending on the degree of rotation of the valve, and means adjustable from the outside for varying the opening of said return port for by-passing through the return port the excess liquid not required in the supply line at full flow.

12. A flow proportioning device as claimed in claim 11, having automatic means for maintaining the same differential pressure between the inlet and supply ports as exists between the inlet and return ports regardless of the viscosity of the liquid.

13. A flow proportioning device for liquids of variable viscosity comprising a pressure chamber consisting of a main body with a common inlet and two outlets, one as a supply outlet and one as a by-pass outlet for all liquid not delivered through the supply port, said body housing a main valve including two ports so arranged that they rotate together to form means to regulate the flow through said means simultaneously and inversely to said outlets from full open to full closed positions, said means being formed by two substantially parallel sided supply and by-pass slots with one part rotated by a regulating arm attached to a valve stem extending to the outside and the second part arranged to slide lengthwise at a sealed joint between the two slots and designed so that the two slots are governed by a cam type adjusting screw extending to the outside, which cam produces small increments in slot width when the slot is narrow but larger increments as the slot widens to the half open position, said slots being so constructed that the sum of the areas of the supply and by-pass slots is always equal to the area of either slot when full open, a second lengthwise sliding valve to by-pass through a third substantially parallel sided slot all liquid in excess of that required through the supply slot when full open with its cooperating slot closed and this valve adjustable, and means for equalizing the discharge pressure in the supply discharge port and the by-pass discharge port so there will always be a common inlet pressure and the same outlet pressure at all three slots.

References Cited by the Examiner
UNITED STATES PATENTS

| | | | |
|---|---|---|---|
| 1,201,724 | 10/1916 | Hansen | 251—310 X |
| 2,140,735 | 12/1938 | Clarke et al. | 137—92 X |
| 2,202,216 | 5/1940 | Madsen | 137—625.17 X |
| 3,092,146 | 6/1963 | Plass | 251—209 X |

WILLIAM F. O'DEA, *Primary Examiner.*

ISADOR WEIL, *Examiner.*

D. ZOBKIW, *Assistant Examiner.*